United States Patent [19]

Tobiyama et al.

[11] Patent Number: 5,447,802

[45] Date of Patent: Sep. 5, 1995

[54] SURFACE TREATED STEEL STRIP WITH MINIMAL PLATING DEFECTS AND METHOD FOR MAKING

[75] Inventors: Yoichi Tobiyama; Chiaki Kato; Nobuyuki Morito; Shigeru Umino, all of Chiba, Japan

[73] Assignee: Kawasaki Steel Corporation, Kobe, Japan

[21] Appl. No.: 157,069

[22] PCT Filed: Mar. 30, 1993

[86] PCT No.: PCT/JP93/00394

§ 371 Date: Apr. 12, 1994

§ 102(e) Date: Apr. 12, 1994

[87] PCT Pub. No.: WO93/20254

PCT Pub. Date: Oct. 14, 1993

[30] Foreign Application Priority Data

Mar. 30, 1992 [JP] Japan ................................ 4-071941
Aug. 12, 1992 [JP] Japan ................................ 4-214944

[51] Int. Cl.$^6$ .......................... B32B 15/18; C23C 2/06; C23C 28/02; C25D 5/10
[52] U.S. Cl. ........................ 428/610; 428/639; 428/659; 428/682; 428/935; 428/939; 148/518; 148/533; 205/228
[58] Field of Search ............... 428/610, 659, 682, 935, 428/939, 941, 639; 148/518, 533, 537; 205/228, 270

[56] References Cited

U.S. PATENT DOCUMENTS

| | | | |
|---|---|---|---|
| 4,543,300 | 9/1985 | Hara et al. | 428/659 |
| 5,019,186 | 5/1991 | Kato et al. | 148/518 |
| 5,326,648 | 7/1994 | Kato et al. | 428/659 |

FOREIGN PATENT DOCUMENTS

| | | | |
|---|---|---|---|
| 58-117866 | 7/1983 | Japan | 428/659 |
| 58-120772 | 7/1983 | Japan | 428/659 |
| 60-121277 | 6/1985 | Japan | 148/518 |
| 60-131977 | 7/1985 | Japan | 428/659 |
| 61-19794 | 1/1986 | Japan | 428/682 |
| 1-139747 | 6/1989 | Japan | 428/659 |
| 2-38549 | 2/1990 | Japan | 428/659 |
| 4-276055 | 10/1992 | Japan | 148/533 |
| 4-276057 | 10/1992 | Japan | 148/533 |
| 5-112830 | 5/1993 | Japan | 148/518 |
| 5-247617 | 9/1993 | Japan | 148/533 |
| 5-311370 | 11/1993 | Japan | 148/533 |

*Primary Examiner*—John Zimmerman
*Attorney, Agent, or Firm*—Staas & Halsey

[57] ABSTRACT

In connection with a process of implementing galvanizing and galvannealing on steel strips containing highly oxidizable elements such as Si, Mn, P, Ti, Nb, Al, Ni, Cu, Mo, V, Cr, and B, after annealing in a continuous line or implementing electroplating after annealing, the present invention provides a method for restraining non-plating at low cost in a stable manner and a surface treated steel strip having minimal non-plating. By applying on at least one surface of a steel strip a Fe plating having a coating weight of 0.1–10 g/m$^2$ and an oxygen content of 0.1–10 wt %, followed by annealing and then zinc or zinc alloy plating, there is obtained a surface treated steel strip having minimal plating defects which includes a Fe plating layer immediately below a zinc or zinc alloy plating layer and a steel alloying element concentrated stratum immediately below the Fe plating layer. The Fe plating may be formed using an electroplating bath which contains 0.1–10 g/l of Fe$^{3+}$ and a carboxylic acid or an alkali metal salt thereof.

18 Claims, 1 Drawing Sheet

1

SURFACE TREATED STEEL STRIP WITH MINIMAL PLATING DEFECTS AND METHOD FOR MAKING

TECHNICAL FIELD

This invention relates to zinc plated steel strips or zinc alloy plated steel strips for use in automobiles, electric appliances and buildings, especially such zinc plated steel strips or zinc alloy plated steel strips based on high tensile strength strip steel and a method for preparing the same.

BACKGROUND ART

In these years, surface treated steel strips having high corrosion resistance are required in the fields of automobiles and electric appliances, and development and practical implementation of various zinc system plated steel strips is on the progress. Among others, zinc system hot dipped steel strips including galvanized steel strips (abbreviated as GI, hereinafter) and galvannealed steel strips (abbreviated as GA, hereinafter) now find practical use as rust-preventive steel strips for not only automotive interiors, but also automotive exteriors since they are low in manufacturing cost as compared with zinc electroplated steel strips and have good corrosion resistance. Also in the field of electroplating, alloy coatings obtained by electroplating alloys such as Zn—Ni and Zn—Fe as well as pure zinc can provide steel strips having high corrosion resistance even with relatively low coating weights.

In recent years, to reduce the emission of automobile exhaust gases is recognized as an important problem from global environment considerations and the automobile manufacturers are required to achieve a vehicle weight reduction. Under such circumstances, since a gage down of strip steel is effective for automobile vehicle weight reduction, the material manufacturers are intensely required to supply high tensile strength strip steel, and research and development efforts have been made on high tensile strength steel strips in which Si, Mn, P, Ti, Nb, Al, Ni, Cu, Mo, V, Cr, B, etc. are added to low or ultra-low carbon steel strips as an element for enhancing their strength without detracting from their shapability. Also coupled with the fact that it has been conventionally required to impart rust prevention to steel strips, the automobile manufacturers strongly desire the development of high tensile strength steel strips to which zinc plating, especially zinc hot dipping (galvanizing) featuring a low manufacturing cost is applied.

However, since the above-mentioned reinforcing elements in steel are likely to be oxidized and unlikely to be reduced, a manufacturing line of the Sendzimir type, which is currently a typical continuous manufacturing line of zinc hot dipping, gives rise to an essential problem that these reinforcing elements are selectively oxidized and concentrated at the surface during annealing. In this case, oxides of reinforcing elements such as Si and Mn concentrated at the steel strip surface during annealing substantially detract from the wettability between the steel strip and molten zinc, so that the adhesiveness of molten zinc coating is substantially reduced and in extreme cases, no molten zinc deposits on the steel strip at all, which is known as a non-plating phenomenon. Also, in the case of GA prepared by galvanizing followed by alloying treatment, there accompanies the problem that the alloying temperature must be extremely increased before the alloying treatment can be completed because oxides of reinforcing elements formed during annealing substantially retard alloying.

Also, in the case of zinc electroplating, the above-mentioned in-steel elements are concentrated at the surface to form a tough coating during an annealing step which is prior to the plating step and therefore, the oxide coating resulting from annealing must be mechanically or chemically removed before zinc plating can be electrodeposited on the steel strip.

In order for zinc hot dipping (galvanizing) or zinc electroplating to be applied to such difficultly platable steel strips, there have been developed methods intended to solve the above-mentioned problem by previously carrying out pre-treatment to the steel strips on their surface in order to prevent non-plating.

For example, Japanese Patent Application Kokai (JP-A) Nos. 70268/1982, 79160/1982 and 104163/1983 disclose a method of effecting Fe plating on a steel strip prior to zinc hot dipping (galvanizing).

DISCLOSURE OF THE INVENTION

The above-mentioned Fe electroplating method, however, suffers from a need for a large sized installation and a high manufacturing cost since the coating weight of Fe plating necessary for preventing non-plating reaches at least 10 g/m$^2$. Depending on the type and quantity of elements in steel and annealing conditions, it is sometimes difficult to completely restrain occurrence of non-plating even when the above-mentioned Fe plating is applied.

In connection with the process of implementing galvanizing and galvannealing on steel strips containing highly oxidizable elements such as Si, Mn, P, Ti, Nb, Al, Ni, Cu, Mo, V, Cr, and B, especially such elements as Si, Mn and P after annealing in a continuous line or implementing electroplating after annealing, an object of the present invention is to provide a method for restraining non-plating at low cost in a stable manner and a surface treated steel strip having minimal non-plating.

The present invention provides a zinc system plated steel strip based on a high tensile strength steel strip stock in which zinc system plating is applied to a high tensile strength steel strip containing highly oxidizable elements, after oxygen-containing Fe plating is applied prior to annealing so that a stratum having in-steel elements concentrated may be formed at the interface between the Fe plating layer and the steel strip during annealing whereby the concentrated stratum serves as a barrier for restraining diffusion of the in-steel elements toward the Fe plating surface during annealing, thereby ensuring good platability, as well as a method for preparing the same.

More particularly, the present invention provides a surface treated steel strip having a zinc plating layer or zinc alloy plating layer coated on at least one surface of a steel strip, characterized by further having a Fe plating layer immediately below the zinc plating layer or zinc alloy plating layer and a steel component concentrated stratum immediately below the Fe plating layer, the surface treated steel strip having minimal plating defects.

Also the present invention provides a method for preparing a surface treated steel strip with minimal plating defects, characterized by the steps of applying on at least one surface of a steel strip a Fe plating having a coating weight of 0.1 to 10 g/m² and an oxygen content of 0.1 to 10 wt %, followed by annealing and then zinc or zinc alloy plating.

The present invention is effective when the steel strip on which Fe plating is applied contains at least one member selected from the group consisting of Si, Mn, P, Ti, Nb, Al, Ni, Cu, Mo, V, Cr, and B in an amount of at least 0.1 wt % for Si, Ti, Ni, Cu, Mo, Cr, and V, at least 0.5 wt % for Mn, at least 0.05 wt % for P, Al, and Nb, and at least 0.001 wt % for B; and more effective particularly when the steel strip on which Fe plating is applied contains at least one member selected from the group consisting of Si, Mn, and P in an amount of 0.1 to 2.0 wt % for Si, 0.5 to 4.0 wt % for Mn and 0.05 to 0.2 wt % for P. Therefore, the concentrated stratum immediately below the Fe plating layer is composed of at least one member of these elements. In forming the oxygen-containing Fe plating layer, it is desirable to use a bath containing at least 0.1 g/l, preferably 0.1 to 20 g/l, more preferably 0.1 to 10 g/l of $Fe^{3+}$ and a carboxylic acid or an alkali metal salt thereof.

Also provided by the present invention is a steel strip stock for surface treatment in which a Fe plating having a coating weight of 0.1 to 10 g/m² and an oxygen content of 0.1 to 10 wt % is applied on at least one surface of a steel strip.

BEST MODE FOR CARRYING OUT THE INVENTION

Figure 1A:
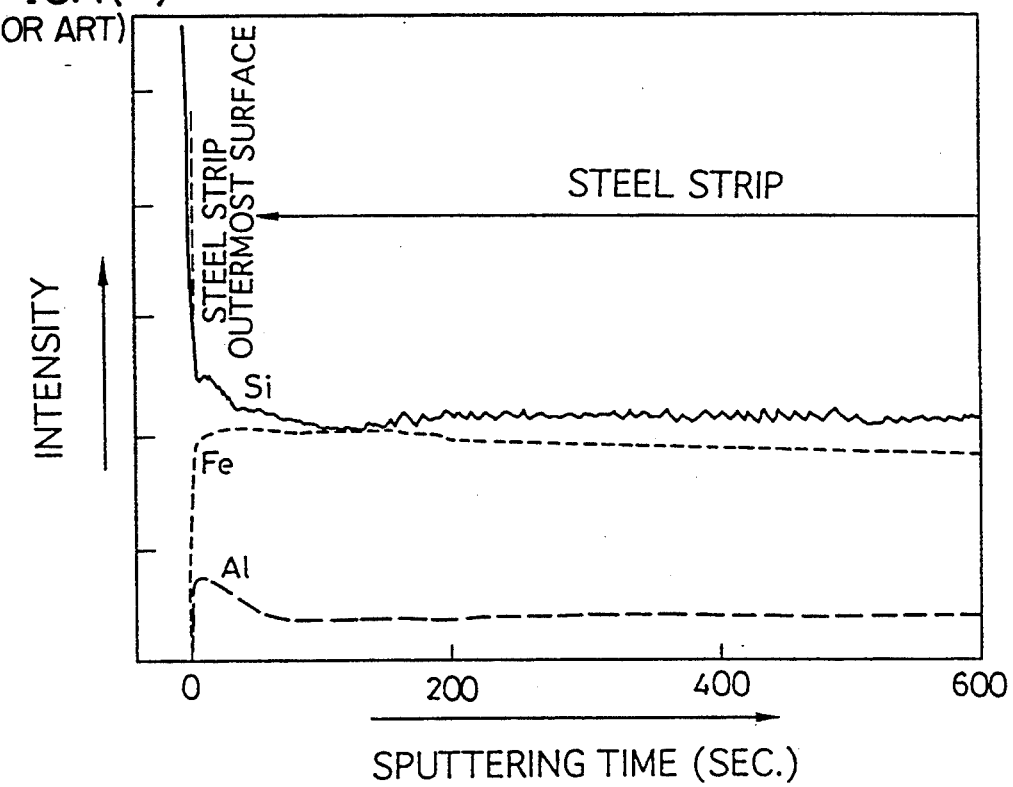
FIG. 1 illustrates analysis results in depth direction by GDS, FIG. 1(b) being a diagram for a treated strip with an oxygen-containing Fe plating according to the present invention and FIG. 1(a) being a diagram for an untreated strip without Fe plating according to the prior art.

Now the present invention is described in further detail.

The steel strips referred to in the present invention are steel strips made of low or ultra-low carbon steel for use in automobiles which contains at least one alloying element selected from reinforcing elements capable of increasing the strength of steel strip without detracting from its shapability, for example, such as Si, Mn, P, Ti, Nb, Al, Ni, Cu, Mo, V, Cr, and B. The term containment used herein means that the element is contained in an amount of at least 0.1 wt % for Si, Ti, Ni, Cu, Mo, Cr and V, at least 0.5 wt % for Mn, at least 0.05 wt % for P, Al and Nb, and at least 0.001 wt % for B.

Especially in order for the steel strip to meet the strength required for enabling automobile vehicle weight reduction while ensuring satisfactory shapability and deep drawability, the steel strip should contain at least one member of Si, Mn, and P in the concentration ranges:

0.1 wt % ≦ Si ≦ 2.0 wt %,
0.5 wt % ≦ Mn ≦ 4.0 wt %, and
0.05 wt % ≦ P ≦ 0.2 wt %.

The lower limit of the concentration range of each of the above-mentioned component elements is determined because a component concentration below the limit cannot insure the strength and deep drawability required for the steel strip.

The upper limit is determined for the following reason. Particularly, if Si exceeds 2%, hot rolled mother strips are significantly hardened to adversely affect cold rolling. If Mn exceeds 4%, the strength increase of steel strip is saturated and the r value is deteriorated. The upper limit of P concentration is determined because P contents in excess of 0.2% would significantly enhance segregation during solidification so that the strength increase is saturated and workability is deteriorated.

In the present invention, the above-mentioned in-steel elements may be present either alone or in admixture of two or more, with a choice being made in accordance with the strength and deep drawability (r value) required for the steel strip.

Where the steel strip contains at least one member of Si, Mn, and P in the above-defined concentration ranges, the present invention is also applicable to the steel strip which further contains at least one member selected from the group consisting of Ti, Nb, Al, Ni, Cu, Mo, V, Cr and B in addition to the first-mentioned element(s). The term containment used herein means that the element is contained in an amount of at least 0.1 wt % for Ti, Ni, Cu, Mo, Cr, and V, at least 0.05 wt % for Al and Nb, and at least 0.001 wt % for B.

When zinc system plating is applied to the steel strip containing the above-mentioned elements, non-plating occurs due to oxides of the elements which are concentrated at the surface during annealing of the strip. Making various investigations on the pre-plating treatment for restraining such highly oxidizable elements from concentrating at the surface, the present inventors have found that application of an Fe plating containing a predetermined concentration of oxygen to the steel strip can completely restrain concentration of in-steel elements at the surface during annealing to insure improved platability during subsequent zinc or zinc alloy hot dipping or zinc or zinc alloy electroplating.

Figure 1B:
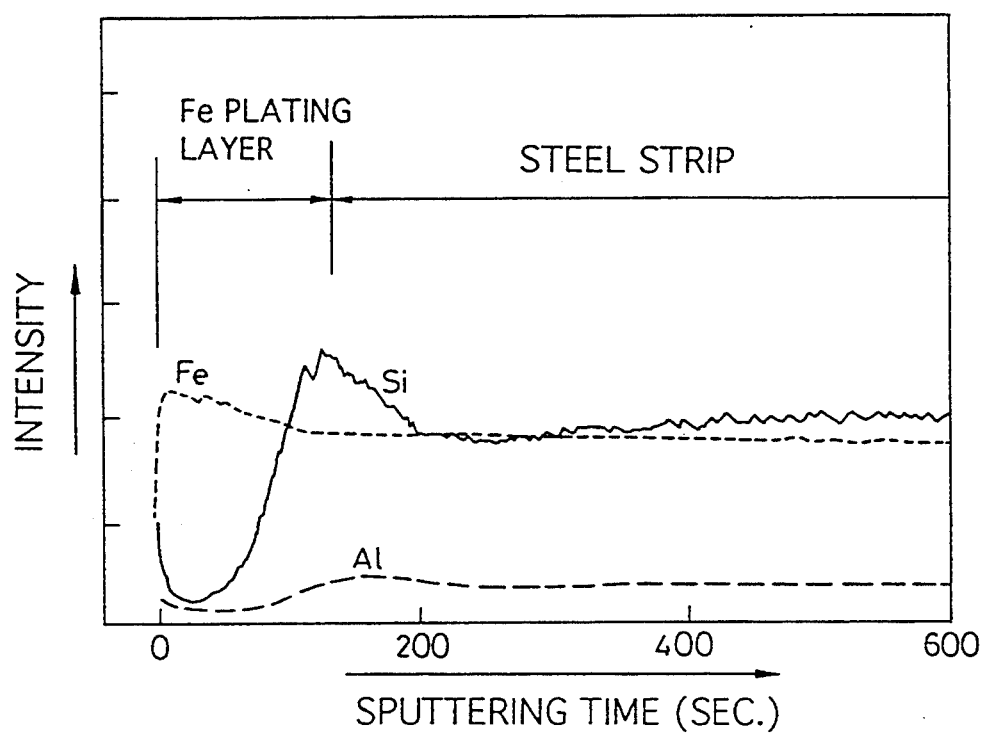

The reason why the surface concentration of in-steel elements during annealing is restrained by the oxygen-containing Fe plating is that oxygen in the Fe plating layer causes the in-steel elements to form a concentrate stratum at the interface between the Fe plating and the steel strip matrix during annealing, and this interfacial concentrate stratum is effective for restraining the in-steel elements from diffusing toward the Fe plating surface. One example is shown in FIG. 1. The steel strip used herein is a steel strip containing C: 0.002 wt %, Si: 1.0 wt %, Mn: 3.0 wt %, P: 0.15 wt %, and Al: 0.03 wt %. The steel strip without Fe plating in FIG. 1 (a) of the prior art and the steel strip having oxygen-containing Fe plating coated in a weight of 4 g/m² in FIG. 1(b) of the present invention were annealed under conditions: a holding temperature of 850° C. and a holding time of 30 seconds. These samples were analyzed in a depth direction by glow discharge spectrometry (GDS), with the results being plotted in FIGS. 1(a) and 1(b). It is apparent from FIG. 1(a) of the Fe plating-free sample that Si and other elements diffused to the steel strip surface. It is seen from FIG. 1(b) of the sample with the oxygen-containing Fe plating that Si formed an interfacial concentrate stratum at the interface between the Fe plating layer and the steel strip, restraining Si from diffusing toward the surface. (See the peak in Si intensity above the Fe intensity at below approximately 200 sec. sputtering time). Since this interfacial concentrate stratum is created only when oxygen is present in proximity to the interface, the effect of the interfacial concentrate stratum for restraining diffusion of in-steel elements is not available with simple Fe plating as employed in the prior art. Where Fe plating layers do not contain oxygen in the range defined by the present invention, a barrier against diffusion of in-steel elements toward the Fe plating surface during annealing is not created at the interface and therefore, the coating weight of Fe plating must be extremely increased in order to restrain diffusion of in-steel elements toward the Fe plating surface during annealing, which means is disadvantageous from operation and installation aspects and fails to restrain surface concentration under certain annealing conditions.

In the practice of the invention, the Fe plating containing oxygen should have a coating weight in the range of 0.1 to 10 g/m². This is because an Fe plating weight of less than 0.1 g/m² is insufficient to restrain non-plating whereas a coating weight of more than 10 g/m² reaches saturation of platability improvement and is disadvantageous in cost.

The concentration range of oxygen that the Fe plating layer contains before annealing should be from 0.1 to 10 wt %, desirably from 1 to 10 wt %. With an oxygen concentration of less than 0.1 wt %, the interfacial concentrate stratum which is effective for restraining the in-steel elements from diffusing toward the surface is not fully formed, allowing the in-steel elements to concentrate at the surface during annealing and failing to provide satisfactory platability. With an oxygen concentration of more than 10 wt %, the oxygen contained in the Fe plating layer itself is not fully reduced during annealing and the residual oxygen which has not been reduced can degrade platability and plating adhesion. Therefore, when a steel strip containing oxidizable in-steel elements is annealed and coated with zinc or zinc alloy plating, the effect of the Fe plating for improving platability can be achieved solely by controlling the oxygen content of the Fe plating layer within the above-defined range.

The oxygen content of the Fe plating layer can be controlled within the above-defined concentration range by using an electroplating bath which contains $Fe^{3+}$ in a concentration of at least 0.1 g/l, preferably 0.1 to 10 g/l and a carboxylic acid. A $Fe^{3+}$ concentration of less than 0.1 g/l would not be able to achieve a sufficiently high oxygen concentration in the plating layer, failing to effectively improve platability. The upper limit of the $Fe^{3+}$ concentration is not critical, but less than 20 g/l is preferred because in excess of 20 g/l, the Fe plating itself would lose adhesion when its coating weight is low and the Fe plating would have a too high oxygen concentration so that some oxygen in the plating is left non-reduced during annealing as previously described, adversely affecting platability. Where one expects more stable effect, a ferric concentration of up to 10 g/l is preferred.

In order that the Fe plating layer contain oxygen, a carboxylic acid is essential along with $Fe^{3+}$. The carboxylic acids used herein include formic acid, acetic acid, benzoic acid, oxalic acid, acrylic acid and the like. Aside from the carboxylic acids, equivalent effect is exerted with metal salts such as alkali metal salts of carboxylic acids in the practice of the invention.

The mechanism that oxygen is incorporated into the Fe plating may be explained as follows. Since the pH at which $Fe^{3+}$ forms a hydroxide is lowered by the carboxylic acid in the plating bath, $Fe^{3+}$ remains dissolved in the plating bath rather than precipitated. This $Fe^{3+}$ forms a hydroxide on the electro-deposit due to a pH rise caused by hydrogen generation in the vicinity of the cathode. Then oxygen is taken into the Fe plating as if it were entrained. In the event of normal Fe plating, that is, when Fe plating is done in a bath in which a $Fe^{3+}$ ion is not intentionally added and its concentration is not controlled, no hydroxide forms on the electro-deposit because of the high pH at which $Fe^{2+}$ forms a hydroxide, and instead, metallic iron is directly electrodeposited so that no oxygen is incorporated into the plating layer. Accordingly, the presence of $Fe^{3+}$ in the plating bath is essential in order that the Fe plating contain oxygen, and a carboxylic acid is essential in order to avoid this $Fe^{3+}$ from precipitating in the conventional Fe plating bath. If both $Fe^{3+}$ and carboxylic acid are absent, it is impossible to control the oxygen concentration to the range necessary for improving platability as contemplated herein.

In the practice of the invention, the concentration of carboxylic acid or metal salt thereof added to the Fe plating bath is not critical although a concentration range of 1 to 100 g/l is practical and desirable.

The Fe plating bath can provide a plating layer with a controlled oxygen concentration by the above-mentioned control of a $Fe^{3+}$ concentration and addition of a carboxylic acid or a metal salt thereof and other conditions need not be particularly restricted. The plating bath may be either a sulfuric acid bath or a chloride bath while another Fe plating bath is acceptable. In addition to the above-mentioned essential components, it is desirable to add Fe to the plating bath in the form of a sulfate or chloride in a concentration of about 20 to 100 g/l of $Fe^{2+}$ as an iron source. It is also acceptable to add conductive aids such as sodium sulfate for increasing electric current efficiency.

Moreover, the plating solution preferably has a temperature of from room temperature to 80° C., with a temperature of 40° to 60° C. being desirable from an industrial aspect. As to pH, no problems arise insofar as it is within the range for conventional acidic bath Fe plating.

It will be understood that the Fe plating layer contains a trace amount of carbon in addition to the above-mentioned oxygen since a carboxylic acid or an alkali metal salt thereof is added to the Fe plating bath according to the invention. In the practice of the invention, from 0.01 wt % to less than 10 wt % of carbon is contained. The present invention also provides a stock for a surface treated steel strip with minimal plating defects in which an oxygen-containing Fe plating as defined above is applied on a steel strip.

The oxygen-containing Fe plating which is formed on a steel strip in this way must be reduced at an annealing step in a continuous hot dipping line or an annealing step preceding electroplating, and any annealing conditions may be used herein as long as an oxidized coating is sufficiently reduced. The atmospheric gas may be hydrogen alone or a mixture of hydrogen and nitrogen, argon, etc., with 3 to 25% hydrogen gas being industrially practical. Desirably the annealing temperature is at least 700° C. for cold rolled steel strips though it varies with the type of steel, and the annealing time is at least 10 seconds.

Where hot dipping is performed on a high tensile strength steel strip by the method disclosed herein, there is obtained a plating free of non-plating. The hot dipped steel strip which has been subject to the pretreatment according to the present invention can be readily subjected to alloying treatment at a temperature in the range of about 450° to 550° C. A galvannealed steel strip is thus obtained from a high tensile strength steel strip stock. In the case of a steel strip containing Si, P, Mn and other elements which substantially retard the alloying rate, where it is zinc hot dipped (galvanized) without Fe plating, alloying at temperatures below 550° C. is difficult and alloying needs temperatures near 600° C., resulting in a deterioration of plating adhesion. Due to the oxygen-containing Fe plating, the method of the invention permits alloying to take place at lower temperatures and can produce a galvannealed steel strip with improved plating adhesion from a high tensile strength steel strip stock. Although the alloying temperature varies with the plating weight, line speed or the like, it is desirable that the alloying temperature be as low as possible in order to provide GA with improved plating adhesion.

EXAMPLE

Examples of the present invention are given below by way of illustration and not by way of limitation.

Example 1

Steel containing C: 0,002 wt %, Si: 1.0 wt %, Mn: 3.0 wt %, and P: 0.15 wt % was prepared from a melt, and conventionally hot rolled and cold rolled into steel strips of 0.7 mm gage. The cold rolled steel strips were degreased and pickled and thereafter, subject to Fe plating in an electroplating bath and conditions as shown in Tables 1 and 2 to a coating weight and oxygen content as shown in Table 3 using the steel strip as a cathode and Pb as an anode. The oxygen content in the Fe plating layer was determined from the difference in oxygen content between the Fe plated steel strip and the untreated steel strip and the Fe plating coating weight.

From the pretreated steel strips, GA samples were prepared by treating under annealing conditions (A), treating under hot dipping conditions (B), and treating under alloying conditions (C), which are designated inventive samples 1—1 to 1-3, and a GI sample was prepared by treating under hot dipping conditions (B), which is designated inventive sample 1-4. A Zn—Ni plated steel strip was prepared by treating the steel strip under annealing conditions (A) and treating under electroplating conditions (D), which is designated inventive sample 1-5.

It is to be noted that the annealing and zinc hot dipping were carried out by means of a hot dipping simulator and the alloying treatment carried out in an infrared heating furnace both on a laboratory scale. The electroplating was carried out by fluidized tank plating on a laboratory scale.

As comparative examples, a steel strip of the same steel composition as used in the inventive samples, but free of an oxygen-containing Fe plating (comparative sample 1—1), steel strips having an Fe plating layer whose oxygen concentration and coating weight were outside the scope of the invention (comparative samples 1-2 to 1-6), and a steel strip free of a highly oxidizable element, that is, having a chemical composition containing C: 0.002 wt %, Si: 0.01 wt %, Mn: 0.1 wt %, and P: 0.01 wt %/comparative sample 1-7) were annealed and treated by GA, GI or Zn—Ni plating as were the inventive samples, obtaining treated steel strips as shown in Tables 2 and 3.

These inventive and comparative samples were evaluated as follows.

(A) Annealing conditions
Heating rate: 10° C./sec.
Holding temperature: 850° C.
Holding time: 30 sec.
Cooling rate: 20° C./sec.
Annealing furnace atmosphere: 5% $H_2$—$N_2$ (dew point −20° C.)
(B) Hot dipping conditions
Bath temperature: 470° C.
Input strip temperature: 470° C.
Al content: 0.15 wt %
Coating weight: 60 g/$m^2$ (each surface)
Dipping time: 1 sec.
(C) Alloying conditions
Heating rate: 20° C./sec.
Cooling rate: 15° C./sec.
Alloying temperature: 490° C.
Alloying time: 30 sec.
(D) Electroplating conditions

| Plating bath | $ZnSO_4$ | 200 g/l |
| | $NiSO_4$ | 80 g/l |
| | $Na_2SO_4$ | 50 g/l |

DK: 100 A/$dm^2$
pH: 1.8
Bath temperature: 60° C.
Coating weight: 30 g/$m^2$
Ni content: 12 wt %
Platability evaluating procedure The outer appearance of a zinc hot dipped strip was visually observed to judge platability in accordance with the following criterion.
O: non-plating is eliminated
X: non-plating occurs
Plating adhesion evaluation Evaluation was made by a dupont impact test (¼ inch, 1 kg, 50 cm). Evaluation criterion is given below.
O: no plating separated
X: plating separated
Alloying rate evaluation The alloying rate was evaluated by examining whether a zinc η phase was left on the surface of each alloyed strip treated under the above-mentioned conditions.
O: no zinc η phase
X: zinc η phase observed Table 3 shows the evaluation results of inventive samples 1—1 to 1-5 and comparative samples 1—1 to 1-7. It is evident from this survey that the method disclosed herein enables to prepare zinc plated steel strips free of non-plating and having improved plating adhesion even from steel strips containing a highly oxidizable element such as Si, Mn, P, Ti, Nb, Al, Ni, Cu, Mo, V, Cr and B. In the case of galvannealed steel strips, the alloying rate is properly accelerated so that they are prepared by the same procedure as the prior art method.

TABLE 1

| Inventive sample | Fe plating bath | | | | $Fe^{3+}$ concentration (g/l) | Bath temp. (°C.) | Dk (A/$dm^2$) | pH |
| --- | --- | --- | --- | --- | --- | --- | --- | --- |
| 1-1 | $FeSO_4.7H_2O$ | 300 g/l | $Na_2SO_4$ | 50 g/l | 5.6 | 60 | 50 | 1.6 |
| | $Fe_2(SO_4)_3$ | 20 g/l | $CH_3COOH$ | 20 g/l | | | | |
| 1-2 | $FeSO_4.7H_2O$ | 250 g/l | $Na_2SO_4$ | 80 g/l | 3.4 | 55 | 100 | 1.8 |

TABLE 1-continued

| Inventive sample | Fe plating bath | | | | $Fe^{3+}$ concentration (g/l) | Bath temp. (°C.) | Dk (A/dm²) | pH |
| --- | --- | --- | --- | --- | --- | --- | --- | --- |
| 1-3 | $Fe_2(SO_4)_3$<br>$FeSO_4.7H_2O$<br>$Fe_2(SO_4)_3$ | 12 g/l<br>200 g/l<br>1 g/l | $Na_3C_6H_5O_7$<br>$K_2SO_4$<br>$K_2C_2O_4$ | 10 g/l<br>30 g/l<br>30 g/l | 0.28 | 50 | 30 | 2.0 |
| 1-4 | $FeCl_2.4H_2O$<br>$FeCl_3.6H_2O$ | 200 g/l<br>10 g/l | KCl<br>$K_2C_7H_5O_2$ | 100 g/l<br>15 g/l | 2.1 | 40 | 150 | 1.5 |
| 1-5 | $FeCl_2.4H_2O$<br>$FeCl_3.6H_2O$ | 250 g/l<br>20 g/l | HCOOH | 40 g/l | 4.2 | 60 | 120 | 2.2 |

TABLE 2

| Comparative sample | Fe plating bath | | | | $Fe^{3+}$ concentration (g/l) | Bath temp. (°C.) | Dk (A/dm²) | pH |
| --- | --- | --- | --- | --- | --- | --- | --- | --- |
| 1-1 | — | — | — | — | — | — | — | — |
| 1-2 | $FeSO_4.7H_2O$<br>$Fe_2(SO_4)_3$ | 250 g/l<br>12 g/l | $Na_2SO_4$ | 80 g/l | 3.4 | 55 | 100 | 1.8 |
| 1-3 | $FeSO_4.7H_2O$<br>$K_2C_2O_4$ | 200 g/l<br>30 g/l | $K_2SO_4$ | 30 g/l | 0 | 50 | 30 | 2.0 |
| 1-4 | $FeCl_2.4H_2O$<br>$FeCl_3.6H_2O$ | 200 g/l<br>100 g/l | KCl<br>$K_2C_7H_5O_2$ | 100 g/l<br>15 g/l | 20.7 | 40 | 150 | 1.5 |
| 1-5 | $FeCl_2.4H_2O$<br>$FeCl_3.6H_2O$ | 250 g/l<br>20 g/l | HCOOH | 40 g/l | 4.1 | 60 | 120 | 2.2 |
| 1-6 | $FeSO_4.7H_2O$ | 220 g/l | $Na_2SO_4$ | 50 g/l | 0 | 50 | 100 | 1.9 |
| 1-7 | — | — | — | — | — | — | — | — |

TABLE 3

| | Fe plating | | Interfacial concentrate stratum after annealing | Zinc plating evaluation | | | |
| --- | --- | --- | --- | --- | --- | --- | --- |
| | Coating weight (g/m²) | Oxygen concentration (wt %) | | Plating type | Platability | Plating adhesion | Residual η phase |
| Inventive sample | | | | | | | |
| 1-1 | 7.0 | 2.0 | formed | GA | ○ | ○ | ○ |
| 1-2 | 3.0 | 5.0 | formed | GA | ○ | ○ | ○ |
| 1-3 | 1.0 | 3.0 | formed | GA | ○ | ○ | ○ |
| 1-4 | 5.0 | 0.5 | formed | GI | ○ | ○ | — |
| 1-5 | 0.3 | 9.0 | formed | Zn—Ni | ○ | ○ | — |
| Comparative sample | | | | | | | |
| 1-1 | — | — | none | GA | X | X | X |
| 1-2 | 12.0 | 0.05 | none | GA | X | X | X |
| 1-3 | 5.0 | 0.08 | none | GA | X | X | X |
| 1-4 | 3.0 | 11.0 | none | GI | X | X | — |
| 1-5 | 0.08 | 3.0 | none | Zn—Ni | X | X | — |
| 1-6 | 7.0 | 0.03 | none | GA | X | X | X |
| 1-7 | — | — | none | GA | ○ | ○ | ○ |

Example 2

Steel containing elements in the concentration shown in Table 4 was prepared from a melt, and conventionally hot rolled and cold rolled into steel strips of 0.7 mm gage. The cold rolled steel strips were degreased and pickled and thereafter, subject to Fe plating in an electroplating bath and conditions as shown in Tables 5 and 6 to a coating weight and oxygen content as shown in Table 7 using the steel strip as a cathode and Pb as an anode. The oxygen content in the Fe plating layer was determined from the difference in oxygen content between the Fe plated steel strip and the untreated steel strip and the Fe plating coating weight.

From the pretreated steel strips, GA samples were prepared by treating under annealing conditions (A), treating under hot dipping conditions (B), and treating under alloying conditions (C), which are designated inventive samples 2-1 to 2-3, 2-6 and 2-7, and a GI sample was prepared by treating under hot dipping conditions (B), which is designated inventive sample 2-4. A Zn—Ni plated steel strip was prepared by treating the steel strip under annealing conditions (A) and treating under electroplating conditions (D), which is designated inventive sample 2-5.

It is to be noted that the annealing and zinc hot dipping were carried out by means of a hot dipping simulator and the alloying treatment carried out in an infrared heating furnace both on a laboratory scale. The electroplating was carried out by fluidized tank plating on a laboratory scale.

As comparative examples, a steel strip containing elements in the concentration shown in Table 4, but free of an oxygen-containing Fe plating (comparative sample 2-1) and steel strips having an Fe plating layer whose oxygen concentration and coating weight were outside the scope of the invention (comparative samples 2—2 to 2-7) were annealed and treated by GA, GI or Zn—Ni plating as were the inventive samples, obtaining treated steel strips as shown in Table 7.

These inventive and comparative samples were evaluated as in Example 1.

Table 7 shows the evaluation results of inventive samples 2-1 to 2-7 and comparative samples 2-1 to 2-7. It is evident from this survey that the method disclosed herein enables to prepare zinc plated steel strips free of non-plating and having improved plating adhesion even from steel strips containing a highly oxidizable element such as Si, Mn, and P. In the case of galvannealed steel strips, the alloying rate is properly accelerated so that they are prepared by the same procedure as the prior art method.

TABLE 4

| | Si | Mn | P | C | Ti | Nb | Al | Ni | Cu | Cr | B | |
|---|---|---|---|---|---|---|---|---|---|---|---|---|
| | | | | | | | | | | | | (unit wt %) |
| Inventive sample | | | | | | | | | | | | |
| 2-1 | 1.00 | 0.30 | 0.10 | 0.0020 | 0.020 | 0.005 | 0.03 | | | 0.50 | 0.0005 | |
| 2-2 | 0.80 | 1.00 | 0.15 | 0.0025 | 0.050 | 0.005 | 0.03 | 0.50 | 0.50 | | 0.0008 | |
| 2-3 | 0.50 | 1.50 | 0.08 | 0.0015 | 0.050 | | 0.03 | | | | 0.0004 | |
| 2-4 | 1.00 | 2.00 | 0.12 | 0.0020 | 0.020 | 0.005 | 0.03 | 1.00 | | | 0.0005 | |
| 2-5 | 0.05 | 2.50 | 0.10 | 0.0025 | | 0.005 | 0.03 | | | | 0.0005 | |
| 2-6 | 0.80 | 4.00 | 0.09 | 0.0020 | 0.030 | 0.005 | 0.03 | 0.30 | 0.40 | | 0.0005 | |
| 2-7 | 2.00 | 0.50 | 0.08 | 0.0020 | | 0.005 | 0.03 | | | | 0.0005 | |
| Comparative sample | | | | | | | | | | | | |
| 2-1 | 1.00 | 0.30 | 0.10 | 0.0015 | 0.050 | 0.005 | 0.03 | | | 0.50 | 0.001 | |
| 2-2 | 0.80 | 1.00 | 0.15 | 0.0020 | | 0.005 | 0.03 | 0.50 | 0.50 | | 0.0008 | |
| 2-3 | 0.50 | 1.50 | 0.08 | 0.0025 | 0.020 | | 0.03 | | | | 0.0005 | |
| 2-4 | 1.00 | 2.00 | 0.12 | 0.0015 | 0.020 | 0.005 | 0.03 | 1.00 | | | 0.0005 | |
| 2-5 | 0.05 | 2.50 | 0.10 | 0.0020 | 0.030 | 0.005 | 0.03 | | | | 0.0001 | |
| 2-6 | 1.00 | 1.00 | 0.10 | 0.0025 | 0.050 | 0.005 | 0.03 | | | | 0.0008 | |
| 2-7 | 0.01 | 0.30 | 0.01 | 0.0020 | 0.025 | 0.005 | 0.03 | | | | 0.0005 | |

Empty sections indicate contents below the detection limit.

TABLE 5

| Inventive sample | Fe plating bath | | | | $Fe^{3+}$ concentration (g/l) | Bath temp. (°C.) | Dk (A/dm$^2$) | pH |
|---|---|---|---|---|---|---|---|---|
| 2-1 | $FeSO_4 \cdot 7H_2O$ | 300 g/l | $Na_2SO_4$ | 50 g/l | 5.6 | 60 | 50 | 1.6 |
| | $Fe_2(SO_4)_3$ | 20 g/l | $CH_3COOH$ | 20 g/l | | | | |
| 2-2 | $FeSO_4 \cdot 7H_2O$ | 250 g/l | $Na_2SO_4$ | 80 g/l | 3.4 | 55 | 100 | 1.8 |
| | $Fe_2(SO_4)_3$ | 12 g/l | $Na_3C_6H_5O_7$ | 10 g/l | | | | |
| 2-3 | $FeSO_4 \cdot 7H_2O$ | 200 g/l | $K_2SO_4$ | 30 g/l | 0.28 | 50 | 30 | 2.0 |
| | $Fe_2(SO_4)_3$ | 1 g/l | $K_2C_2O_4$ | 30 g/l | | | | |
| 2-4 | $FeCl_2 \cdot 4H_2O$ | 200 g/l | KCl | 100 g/l | 2.1 | 40 | 150 | 1.5 |
| | $FeCl_3 \cdot 6H_2O$ | 10 g/l | $K_2C_7H_5O_2$ | 15 g/l | | | | |
| 2-5 | $FeCl_2 \cdot 4H_2O$ | 250 g/l | | | 4.2 | 60 | 120 | 2.2 |
| | $FeCl_3 \cdot 6H_2O$ | 20 g/l | HCOOH | 40 g/l | | | | |
| 2-6 | $FeSO_4 \cdot 7H_2O$ | 250 g/l | $Na_2SO_4$ | 80 g/l | 12.6 | 60 | 80 | 1.8 |
| | $Fe_2(SO_4)_3$ | 45 g/l | $Na_3C_6H_5O_7$ | 10 g/l | | | | |
| 2-7 | $FeSO_4 \cdot 7H_2O$ | 300 g/l | $Na_2SO_4$ | 50 g/l | 19.6 | 60 | 50 | 1.6 |
| | $Fe_2(SO_4)_3$ | 70 g/l | $CH_3COOH$ | 20 g/l | | | | |

TABLE 6

| Comparative sample | Fe plating bath | | | | $Fe^{3+}$ concentration (g/l) | Bath temp. (°C.) | Dk (A/dm$^2$) | pH |
|---|---|---|---|---|---|---|---|---|
| 2-1 | — | — | — | — | — | — | — | — |
| 2-2 | $FeSO_4 \cdot 7H_2O$ | 250 g/l | $Na_2SO_4$ | 80 g/l | 3.4 | 55 | 100 | 1.8 |
| | $Fe_2(SO_4)_3$ | 12 g/l | | | | | | |
| 2-3 | $FeSO_4 \cdot 7H_2O$ | 200 g/l | $K_2SO_4$ | 30 g/l | 0 | 50 | 30 | 2.0 |
| | $K_2C_2O_4$ | 30 g/l | | | | | | |
| 2-4 | $FeCl_2 \cdot 4H_2O$ | 200 g/l | KCl | 100 g/l | 20.7 | 40 | 150 | 1.5 |
| | $FeCl_3 \cdot 6H_2O$ | 100 g/l | $K_2C_7H_5O_2$ | 15 g/l | | | | |
| 2-5 | $FeCl_2 \cdot 4H_2O$ | 250 g/l | | | 4.1 | 60 | 120 | 2.2 |
| | $FeCl_3 \cdot 6H_2O$ | 20 g/l | HCOOH | 40 g/l | | | | |
| 2-6 | $FeSO_4 \cdot 7H_2O$ | 220 g/l | $Na_2SO_4$ | 50 g/l | 0 | 50 | 100 | 1.9 |
| 2-7 | — | — | — | — | — | — | — | — |

TABLE 7

| | Fe plating | | Interfacial concentrate stratum after annealing | Zinc plating evaluation | | | |
|---|---|---|---|---|---|---|---|
| | Coating weight (g/m$^2$) | Oxygen concentration (wt %) | | Plating type | Platability | Plating adhesion | Residual η phase |
| Inventive sample | | | | | | | |
| 2-1 | 7.0 | 2.0 | formed | GA | ◯ | ◯ | ◯ |
| 2-2 | 3.0 | 5.0 | formed | GA | ◯ | ◯ | ◯ |
| 2-3 | 1.0 | 3.0 | formed | GA | ◯ | ◯ | ◯ |
| 2-4 | 5.0 | 0.5 | formed | GI | ◯ | ◯ | — |
| 2-5 | 0.3 | 9.0 | formed | Zn—Ni | ◯ | ◯ | — |
| 2-6 | 7.0 | 8.0 | formed | GA | ◯ | ◯ | ◯ |
| 2-7 | 9.0 | 8.0 | formed | GA | ◯ | ◯ | ◯ |
| Comparative sample | | | | | | | |
| 2-1 | — | — | none | GA | X | X | X |
| 2-2 | 12.0 | 0.05 | none | GA | X | X | X |
| 2-3 | 5.0 | 0.08 | none | GA | X | X | X |

TABLE 7-continued

| | Fe plating | | Interfacial concentrate stratum after annealing | Zinc plating evaluation | | | |
|---|---|---|---|---|---|---|---|
| | Coating weight (g/m$^2$) | Oxygen concentration (wt %) | | Plating type | Platability | Plating adhesion | Residual $\eta$ phase |
| 2-4 | 3.0 | 11.0 | none | GI | X | X | — |
| 2-5 | 0.08 | 3.0 | none | Zn—Ni | X | X | — |
| 2-6 | 7.0 | 0.03 | none | GA | X | X | X |
| 2-7 | — | — | none | GA | ◯ | ◯ | ◯ |

Example 3

Steel containing elements in the concentration shown in Table 8 was prepared from a melt, and conventionally hot rolled and cold rolled into steel strips of 0.7 mm gage. The cold rolled steel strips were degreased and pickled and thereafter, subject to Fe plating in an electroplating bath and conditions as shown in Tables 9 and 10 to a coating weight and oxygen content as shown in Table 11 using the steel strip as a cathode and Pb as an anode. The oxygen content in the Fe plating layer was determined from the difference in oxygen content between the Fe plated steel strip and the untreated steel strip and the Fe plating coating weight.

From the pretreated steel strips, GA samples were prepared by treating under annealing conditions (A), treating under hot dipping conditions (B), and treating under alloying conditions (C), which are designated inventive samples 3-1 to 3—3, 3-6 and 3-7, and a GI sample was prepared by treating under hot dipping conditions (B), which is designated inventive sample 3-4. A Zn—Ni plated steel strip was prepared by treating the steel strip under annealing conditions (A) and treating under electroplating conditions (D), which is designated inventive sample 3-5.

It is to be noted that the annealing and zinc hot dipping were carried out by means of a hot dipping simulator and the alloying treatment carried out in an infrared heating furnace both on a laboratory scale. The electroplating was carried out by fluidized tank plating on a laboratory scale.

As comparative examples, a steel strip of the same steel composition as used in the inventive samples, but free of an oxygen-containing Fe plating (comparative sample 3-1), steel strips having an Fe plating layer whose oxygen concentration and coating weight were outside the scope of the invention (comparative samples 3-2 to 3-6), and a steel strip free of a highly oxidizable element, that is, having a chemical composition containing C: 0.002 wt %, Si: 0.01 wt %, Mn: 0.1 wt %, and P: 0.01 wt % (comparative sample 3-7) were annealed and treated by GA, GI or Zn—Ni plating as were the inventive samples, obtaining treated steel strips as shown in Table 11.

These inventive and comparative samples were evaluated as in Example 1.

Table 11 shows the evaluation results of inventive samples 1 to 7 and comparative samples 1 to 7. It is evident from this survey that the method disclosed herein enables to prepare zinc plated steel strips free of non-plating and having improved plating adhesion even from steel strips containing a highly oxidizable element such as Si, Mn, P, Ti, Nb, Al, Ni, Cu, Mo, V, Cr and B. In the case of galvannealed steel strips, the alloying rate is properly accelerated so that they are prepared by the same procedure as the prior art method.

TABLE 8

| | (unit wt %) | | | | | | | | | | | | |
|---|---|---|---|---|---|---|---|---|---|---|---|---|---|
| | Si | Mn | P | C | Ti | Nb | Al | Ni | Cu | Mo | V | Cr | B |
| Inventive sample | | | | | | | | | | | | | |
| 3-1 | 1.00 | 3.00 | 0.15 | 0.0020 | | | 0.03 | | | | | | 0.0005 |
| 3-2 | 1.50 | 1.00 | 0.10 | 0.0025 | 0.050 | 0.060 | 0.03 | 0.30 | 0.40 | | | | 0.0008 |
| 3-3 | 0.50 | 1.50 | 0.08 | 0.0015 | 0.050 | | 0.03 | 0.40 | | | | | 0.0004 |
| 3-4 | 0.20 | 1.00 | 0.10 | 0.0020 | 0.150 | | 0.005 | 0.03 | | 0.20 | | | 0.0005 |
| 3-5 | 0.05 | 2.50 | 0.05 | 0.0025 | | | 0.005 | 0.03 | | | | | 0.0010 |
| 3-6 | 0.80 | 4.00 | 0.09 | 0.0020 | 0.030 | | 0.005 | 0.03 | | | 0.10 | | 0.0005 |
| 3-7 | 2.00 | 0.50 | 0.08 | 0.0020 | | | 0.005 | 0.03 | | | | 0.50 | 0.0005 |
| Comparative sample | | | | | | | | | | | | | |
| 3-1 | 1.00 | 0.30 | 0.10 | 0.0015 | 0.050 | | 0.005 | 0.03 | | | | 0.50 | 0.0010 |
| 3-2 | 0.80 | 1.00 | 0.15 | 0.0020 | | | 0.005 | 0.03 | 0.50 | 0.50 | | | 0.0008 |
| 3-3 | 0.50 | 1.50 | 0.08 | 0.0025 | 0.020 | | | 0.03 | | | | | 0.0005 |
| 3-4 | 1.00 | 2.00 | 0.12 | 0.0015 | 0.020 | | 0.005 | 0.03 | 1.00 | | | | 0.0005 |
| 3-5 | 0.05 | 2.50 | 0.10 | 0.0020 | 0.030 | | 0.005 | 0.03 | | | | | 0.0001 |
| 3-6 | 1.00 | 1.00 | 0.10 | 0.0025 | 0.050 | | 0.005 | 0.03 | | | | | 0.0008 |
| 3-7 | 0.01 | 0.30 | 0.01 | 0.0020 | 0.025 | | 0.005 | 0.03 | | | | | 0.0005 |

Empty sections indicate contents below the detection limit.

TABLE 9

| Inventive sample | Fe plating bath | | | | $Fe^{3+}$ concentration (g/l) | Bath temp. (°C.) | Dk (A/dm$^2$) | pH |
|---|---|---|---|---|---|---|---|---|
| 3-1 | FeSO$_4$.7H$_2$O | 300 g/l | Na$_2$SO$_4$ | 50 g/l | 5.6 | 60 | 50 | 1.6 |
| | Fe$_2$(SO$_4$)$_3$ | 20 g/l | CH$_3$COOH | 20 g/l | | | | |
| 3-2 | FeSO$_4$.7H$_2$O | 250 g/l | Na$_2$SO$_4$ | 80 g/l | 3.4 | 55 | 100 | 1.8 |
| | Fe$_2$(SO$_4$)$_3$ | 12 g/l | Na$_3$C$_6$H$_5$O$_7$ | 10 g/l | | | | |
| 3-3 | FeSO$_4$.7H$_2$O | 200 g/l | K$_2$SO$_4$ | 30 g/l | 0.28 | 50 | 30 | 2.0 |
| | Fe$_2$(SO$_4$)$_3$ | 1 g/l | K$_2$C$_2$O$_4$ | 30 g/l | | | | |
| 3-4 | FeCl$_2$.4H$_2$O | 200 g/l | KCl | 100 g/l | 2.1 | 40 | 150 | 1.5 |
| | FeCl$_3$.6H$_2$O | 10 g/l | K$_2$C$_7$H$_5$O$_2$ | 15 g/l | | | | |
| 3-5 | FeCl$_2$.4H$_2$O | 250 g/l | | | 4.2 | 60 | 120 | 2.2 |
| | FeCl$_3$.6H$_2$O | 20 g/l | HCOOH | 40 g/l | | | | |

TABLE 9-continued

| Inventive sample | Fe plating bath | | | | $Fe^{3+}$ concentration (g/l) | Bath temp. (°C.) | Dk (A/dm$^2$) | pH |
| --- | --- | --- | --- | --- | --- | --- | --- | --- |
| 3-6 | $FeSO_4.7H_2O$ | 250 g/l | $Na_2SO_4$ | 80 g/l | 12.6 | 60 | 80 | 1.8 |
| | $Fe_2(SO_4)_3$ | 45 g/l | $Na_3C_6H_5O_7$ | 10 g/l | | | | |
| 3-7 | $FeSO_4.7H_2O$ | 300 g/l | $Na_2SO_4$ | 50 g/l | 19.6 | 60 | 50 | 1.6 |
| | $Fe_2(SO_4)_3$ | 70 g/l | $CH_3COOH$ | 20 g/l | | | | |

TABLE 10

| Comparative sample | Fe plating bath | | | | $Fe^{3+}$ concentration (g/l) | Bath temp. (°C.) | Dk (A/dm$^2$) | pH |
| --- | --- | --- | --- | --- | --- | --- | --- | --- |
| 3-1 | — | | — | | — | — | — | — |
| 3-2 | $FeSO_4.7H_2O$ | 250 g/l | $Na_2SO_4$ | 80 g/l | 3.4 | 55 | 100 | 1.8 |
| | $Fe_2(SO_4)_3$ | 12 g/l | | | | | | |
| 3-3 | $FeSO_4.7H_2O$ | 200 g/l | $K_2SO_4$ | 30 g/l | 0 | 50 | 30 | 2.0 |
| | $K_2C_2O_4$ | 30 g/l | | | | | | |
| 3-4 | $FeCl_2.4H_2O$ | 200 g/l | KCl | 100 g/l | 20.7 | 40 | 150 | 1.5 |
| | $FeCl_3.6H_2O$ | 100 g/l | $K_2C_7H_5O_2$ | 15 g/l | | | | |
| 3-5 | $FeCl_2.4H_2O$ | 250 g/l | | | 4.1 | 60 | 120 | 2.2 |
| | $FeCl_3.6H_2O$ | 20 g/l | HCOOH | 40 g/l | | | | |
| 3-6 | $FeSO_4.7H_2O$ | 220 g/l | $Na_2SO_4$ | 50 g/l | 0 | 50 | 100 | 1.9 |
| 3-7 | — | | — | | — | — | — | — |

TABLE 11

| | Fe plating | | Interfacial concentrate stratum after annealing | Zinc plating evaluation | | | |
| --- | --- | --- | --- | --- | --- | --- | --- |
| | Coating weight (g/m$^2$) | Oxygen concentration (wt %) | | Plating type | Platability | Plating adhesion | Residual $\eta$ phase |
| Inventive sample | | | | | | | |
| 3-1 | 7.0 | 2.0 | formed | GA | ◯ | ◯ | ◯ |
| 3-2 | 3.0 | 5.0 | formed | GA | ◯ | ◯ | ◯ |
| 3-3 | 1.0 | 3.0 | formed | GA | ◯ | ◯ | ◯ |
| 3-4 | 5.0 | 0.5 | formed | GI | ◯ | ◯ | — |
| 3-5 | 0.3 | 9.0 | formed | Zn—Ni | ◯ | ◯ | — |
| 3-6 | 7.0 | 8.0 | formed | GA | ◯ | ◯ | ◯ |
| 3-7 | 9.0 | 8.0 | formed | GA | ◯ | ◯ | ◯ |
| Comparative sample | | | | | | | |
| 3-1 | — | — | none | GA | X | X | X |
| 3-2 | 12.0 | 0.05 | none | GA | X | X | X |
| 3-3 | 5.0 | 0.08 | none | GA | X | X | X |
| 3-4 | 3.0 | 11.0 | none | GI | X | X | — |
| 3-5 | 0.08 | 3.0 | none | Zn—Ni | X | X | — |
| 3-6 | 7.0 | 0.03 | none | GA | X | X | X |
| 3-7 | — | — | none | GA | ◯ | ◯ | ◯ |

INDUSTRIAL APPLICABILITY

In zinc or zinc alloy plating of high tensile strength steel strips, the present invention enables to manufacture zinc or zinc alloy plated steel strips free of non-plating and having improved plating adhesion in a cost effective, stable manner. Where they are further subject to alloying treatment, galvannealed steel strips can be manufactured at relatively low temperatures.

In the present days when development of galvanized steel strips, galvannealed steel strips, and zinc or zinc alloy electroplated steel strips all from high tensile strength steel strips is desired to meet the urgent need for an automobile weight reduction, the present invention makes a great contribution to the industry.

We claim:

1. A surface treated steel strip having minimal plating defects, comprising:
   a steel strip;
   a zinc plating layer or zinc alloy plating layer coated on at least one surface of the steel strip;
   a Fe plating layer immediately below the zinc plating layer or zinc alloy plating layer; and
   a steel alloying element concentrated stratum immediately below the Fe plating layer, the surface treated steel strip having minimal plating defects.

2. A surface treated steel strip with minimal plating defects according to claim 1 wherein the concentrated stratum immediately below the Fe plating layer is comprised of at least one member selected from the group consisting of Si, Mn, P, Ti, Nb, Al, Ni, Cu, Mo, V, Cr, and B.

3. A surface treated steel strip with minimal plating defects according to claim 1 wherein at least one element of Si, Mn, and P is contained as the steel alloying element in the following concentration ranges:
   $0.1$ wt $\% \leq Si \leq 2.0$ wt $\%$,
   $0.5$ wt $\% \leq Mn \leq 4.0$ wt $\%$, and
   $0.05$ wt $\% \leq P \leq 0.2$ wt $\%$.

4. A surface treated steel strip with minimal plating defects according to claim 3 wherein the Fe plating layer has a coating weight of 0.1 to 10 g/m$^2$.

5. A surface treated steel strip with minimal plating defects according to claim 3 wherein the concentrated stratum immediately below the Fe plating layer is formed by applying on at least one steel strip surface a Fe plating having a coating weight of 0.1 to 10 g/m$^2$ and an oxygen content of 0.1 to 10 wt %, followed by annealing.

6. A surface treated steel strip with minimal plating defects according to claim 1 wherein the Fe plating layer has a coating weight of 0.1 to 10 g/m².

7. A surface treated steel strip with minimal plating defects according to claim 1 wherein the concentrated stratum immediately below the Fe plating layer is formed by applying on at least one steel strip surface a Fe plating having a coating weight of 0.1 to 10 g/m² and an oxygen content of 0.1 to 10 wt %, followed by annealing.

8. A stock for a surface treated steel strip with minimal plating defects, characterized in that a Fe plating having a coating weight of 0.1 to 10 g/m² and an oxygen content of 0.1 to 10 wt % is applied on at least one surface of a steel strip.

9. A method for preparing a surface treated steel strip with minimal plating defects, characterized by the steps of applying on at least one surface of a steel strip a Fe plating having a coating weight of 0.1 to 10 g/m² and an oxygen content of 0.1 to 10 wt %, followed by annealing and then zinc or zinc alloy plating.

10. A method for preparing a surface treated steel strip with minimal plating defects according to claim 9 wherein the steel strip on which said Fe plating is applied contains at least one element selected from the group consisting of Si, Mn, P, Ti, Nb, Al, Ni, Cu, Mo, V, Cr, and B in an amount of at least 0.1 wt % for Si, Ti, Ni, Cu, Mo, Cr, and V, at least 0.5 wt % for Mn, at least 0.05 wt % for P, Al, and Nb, and at least 0.001 wt % for B.

11. A method for preparing a surface treated steel strip with minimal plating defects according to claim 10 wherein an electroplating bath for said Fe plating contains at least 0.1 g/l of $Fe^{3+}$ and a carboxylic acid or an alkali metal salt thereof.

12. A method for preparing a surface treated steel strip with minimal plating defects according to claim 10 wherein an electroplating bath for said Fe plating contains 0.1 to 20 g/l of $Fe^{3+}$ and a carboxylic acid or an alkali metal salt thereof.

13. A method for preparing a surface treated steel strip with minimal plating defects according to claim 10 wherein an electroplating bath for said Fe plating contains 0.1 to 10 g/l of $Fe^{3+}$ and a carboxylic acid or an alkali metal salt thereof.

14. A method for preparing a surface treated steel strip with minimal plating defects according to claim 9 wherein the steel strip on which said Fe plating is applied contains as a steel alloying element at least one element of Si, Mn, and P in the following concentration ranges:

0.1 wt % ≦ Si ≦ 2.0 wt %,
0.5 wt % ≦ Mn ≦ 4.0 wt %, and
0.05 wt % ≦ P ≦ 0.2 wt %.

15. A method for preparing a surface treated steel strip with minimal plating defects according to claim 9 wherein an electroplating bath for said Fe plating contains at least 0.1 g/l of $Fe^{3+}$ and a carboxylic acid or an alkali metal salt thereof.

16. A method for preparing a surface treated steel strip with minimal plating defects according to claim 9 wherein an electroplating bath for said Fe plating contains 0.1 to 20 g/l of $Fe^{3+}$ and a carboxylic acid or an alkali metal salt thereof.

17. A method for preparing a surface treated steel strip with minimal plating defects according to claim 9 wherein an electroplating bath for said Fe plating contains 0.1 to 10 g/l of $Fe^{3+}$ and a carboxylic acid or an alkali metal salt thereof.

18. A method for preparing a surface treated steel strip with minimal plating defects according to claim 14 wherein an electroplating bath for said Fe plating contains at least 0.1 g/l of $Fe^{3+}$ and a carboxylic acid or an alkali metal salt thereof.

* * * * *